B. C. AMES.
SAFETY MEANS FOR POWER PRESSES.
APPLICATION FILED JAN. 14, 1916.
1,216,645.
Patented Feb. 20, 1917.
2 SHEETS—SHEET 1.
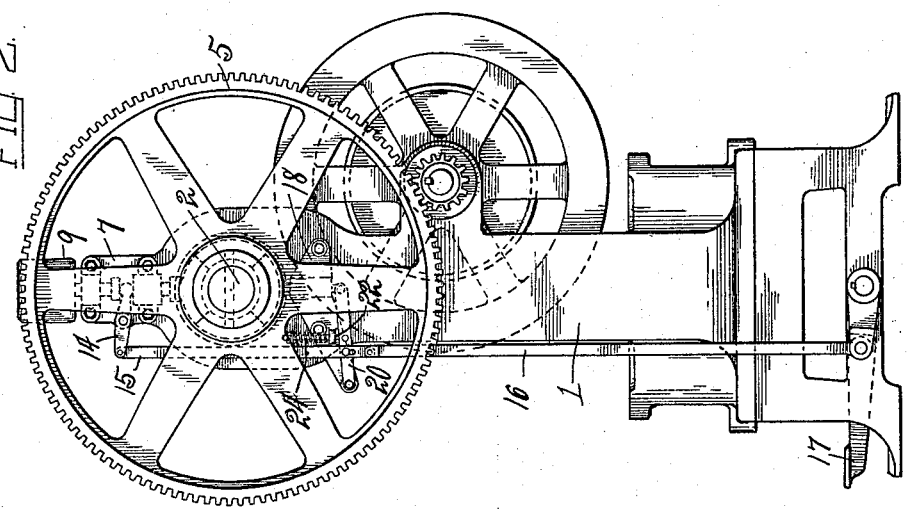
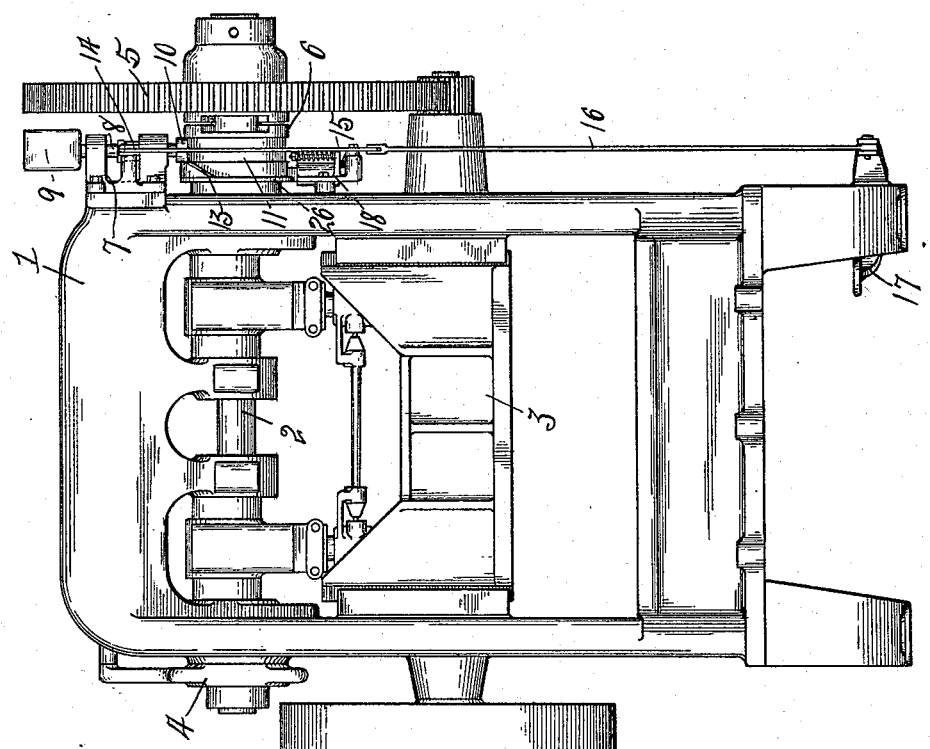
INVENTOR
Burton C. Ames,
By Owen, Owen & Crampton,
His attys.

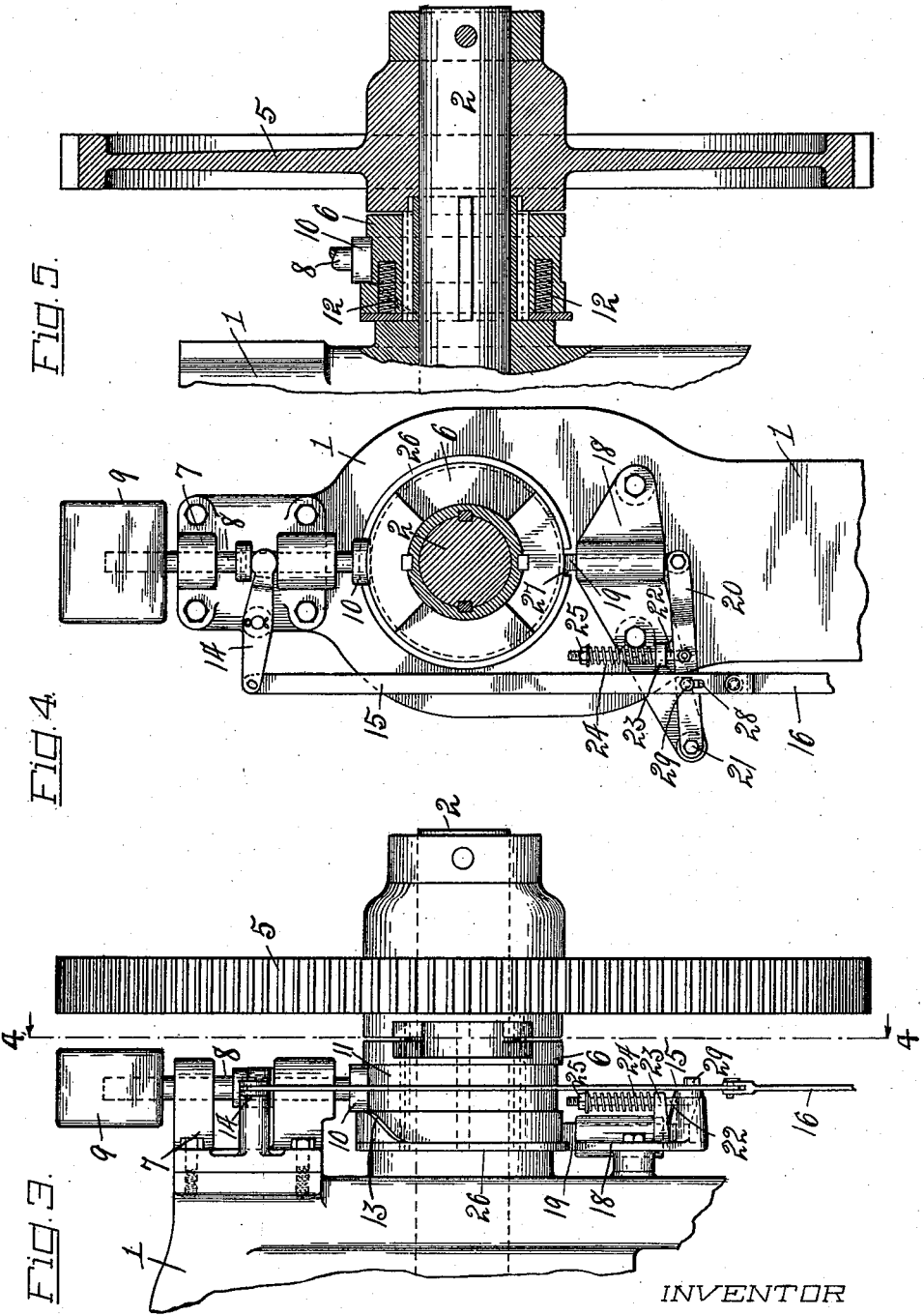

UNITED STATES PATENT OFFICE.

BURTON C. AMES, OF TOLEDO, OHIO.

SAFETY MEANS FOR POWER-PRESSES.

1,216,645.  Specification of Letters Patent.  Patented Feb. 20, 1917.

Application filed January 14, 1916. Serial No. 72,075.

*To all whom it may concern:*

Be it known that I, BURTON C. AMES, a citizen of the United States, and a resident of Toledo, in the county of Lucas and State of Ohio, have invented a certain new and useful Safety Means for Power-Presses; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to safety devices for use on power presses or the like, and has for its object the provision of simple and improved means for effecting a positive stopping of the operating parts after each cycle of operations, thereby preventing liability of injury to the operator or attendant by reason of a premature or unexpected lowering of the punch or die carrying slide.

The invention is fully described in the following specification, and while, in its broader aspect, it is capable of embodiment in numerous forms, a preferred embodiment thereof is illustrated in the accompanying drawings, in which,—

Figures 1 and 2 are front and side elevations of a power press embodying the invention. Fig. 3 is an enlarged front elevation of the mechanism embodying the invention with the associated clutch in released position. Fig. 4 is a section on the line 4—4 in Fig. 3, and Fig. 5 is a section of the clutch parts taken longitudinally of their axis.

Referring to the drawings, 1 designates the frame of a power press, 2 the customary crank or cam shaft, and 3 the upper die carrying slide that is supported by the shaft 2 and connected to the crank or cam portion thereof, whereby a rotation of the shaft imparts vertical reciprocatory movements to the slide. The shaft 2 is provided at one end thereof with a friction brake member 4 that is anchored to the press frame and serves to resist a turning of the shaft, as is well understood in the art. A power member 5 is loosely mounted on one end of the shaft 2, said member, in the present instance, comprising a gear, and feathered to the shaft 2 between the member 5 and press frame is a shiftable clutch collar 6 that is movable axially of the shaft into and out of clutch engagement with the hub portion of the power member 5.

Disposed above the clutch member 6 is a frame bracket 7, having vertically spaced arms for guiding the reciprocatory movements of a rod or stem 8, which carries a weight 9 at its upper end and a roller 10 at its lower end, said roller having its axis disposed longitudinally of the rod. The roller 10 normally rests in a peripheral groove 11 in the clutch member 6 and coacts with a portion of the inner wall thereof to retain the clutch member 6 in released position. Upon a raising of the roller 10 from within the groove 11, the clutch member 6 is automatically moved into clutch engagement with its companion, by springs 12 or in any other suitable manner, as is well understood in the art. Upon a release or lowering of the roller 10 after being raised from within the groove 11, it stands in the path of movement of a cam surface or shoulder 13 at the rear or inner edge of the groove 11, and when the clutch member 6 and parts attached thereto have approximately completed a revolution, the cam shoulder 13 coacts with the roller 10 to retract the clutch member from engagement with the power member 5 and to place the groove 11 into vertical register with the roller, as shown in Fig. 3. When the clutch member 6 has been moved from engagement with the drive member 5, the shaft 2 and parts carried thereby are brought to a stop by the frictional braking action of the brake means 4 on the shaft. It has been common to depend on this brake means to prevent a turning of the crank shaft and consequent lowering of the die carrying slide 3 under the excessive weight of the latter, and it is to overcome such liability of the shaft turning under the weight of the slide 3 and parts carried thereby that the present invention is provided. The raising movements of the rod or stem 8 with respect to the clutch member 6 are controlled by a lever 14, which is fulcrumed to a part of the bracket 7 and has one end in forked engagement with said rod and its other end connected by a pair of link members 15 and 16 with a foot treadle 17 or other suitable control part. The construction above described is common to power presses and need not therefore be described in greater detail.

The safety means embodying my invention will now be described. Secured to the side of the frame 1 below the clutch member 6 is a bracket 18, the outer end portion of which is transversely broadened with respect to the frame and provided immediately below the rear or inner edge portion of the clutch member 6 with a vertical guide-way or opening in which a lock-pin 19 is mounted for vertical reciprocatory movements. The pin 19 is carried at its lower end by the free end of a lever member 20 to which it is pivoted, said lever member being pivoted at its opposite end, as at 21, to one end of the bracket 18. A rod or stem 22 is pivoted to and projects upward from the lever member 20 intermediate its ends and through a guide-boss 23 on the bracket 18. A coiled compression spring 24 is disposed on the rod 22 above the guide-boss 23 and has its lower end thrust against said boss, and its upper end thrust against a nut 25 that is threaded on the upper end of the rod 22. It is thus evident that the lever 20 and lock-pin 19 are normally held in raised position by the action of the rod 22 and spring 24 in connection with the boss 23.

The clutch member 6 is provided at its inner end with a circumferential flange or shoulder 26 having a notch 27, which registers with the stop-pin 19 and receives said pin when the clutch member 6 and shaft 2 are at rest position, with the die carrying slide 3 at the upper end of its stroke. The control link 15 is provided with a longitudinally extending slot 28 through which a pin 29 on the lever 20 loosely projects. When the control parts are in their normal position, the upper end of the slot 28 is substantially in contact with the upper side of the pin 29 so that a downward clutch releasing movement of the link 15 will effect a lowering of the lever 20 against the tension of the spring 24 and a consequent withdrawing of the lock-pin 19 from within the notch 27 of the clutch member 6, thus permitting the clutch member 6 to turn with the drive member 5 when it moves into clutch engagement therewith. When the downward pressure on the link 15 has been released by the operator to permit a lowering of the roller 10 into position to coact with the cam shoulder 13 of the clutch member 6, when said member is near the completion of a revolution or cycle of movement thereof, the pin 19 rests against the flange 26 and does not return to its normal position until the notch 27 has turned into register therewith. It is therefore the purpose of the slot 28 in the link 15 to permit said link to return to its normal raised position when the lever 20 is still retained in its lowered position by reason of the stop-pin bearing against the flange 27.

In the use of a machine embodying my invention it is evident that a downward movement of the control links 15, 16 to effect an operation of the press will cause a simultaneous raising of the roller 10, to permit an engaging of the clutch member 6 with the drive member 5, and a lowering of the stop-pin 19 from within the notch 27 of the clutch member 6 to permit a turning of the clutch member with the drive member. When the operating parts have begun a cycle of movements the operator releases the downward pressure on the links 15, 16, thus permitting the roller 10 to lower into position to coact with the cam shoulder 13 on the clutch member 6 and effect a release of such clutch member from engagement with the drive member 5. When the clutch member 6 has been moved to released position, the turning movement of the crank-shaft 2 will be stopped by the frictional coaction of the brake means 4 therewith, said brake means, when in proper working condition, resisting a turning of the shaft due to the weight of the die carrying slide 3 thereon and will hold the parts in normal inoperative position. When the clutch member 6 has been given a complete turn the stop-pin 19 moves into the registering notch 27 of the clutch member and stops a further rotation thereof should the brake means 4, by reason of wear or some defect be unable to stop the turning of the crank-shaft at the end of a complete rotation thereof.

It is thus evident that I have provided a simple and efficient safety device, which is released from engagement with the clutch member by the releasing movements of the clutch control means, and automatically acts on the clutch, or some part which is fixed to the shaft for turning therewith, to stop its turning movement at the end of each complete rotation thereof.

I wish it understood that my invention is not limited to any specific construction, arrangement or form of the parts or to the use of the same in connection with any particular form or construction of clutch and clutch control means, as numerous modifications can be made without departing from the spirit of the claims.

Having thus described my invention, what I claim as new, and desire to secure by Letters Patent, is,—

1. In combination, a shaft, drive means for said shaft normally disengaged therefrom, a part mounted on and rotatable with the shaft and having a stop shoulder, a pin for coacting with the stop shoulder of said part to prevent a turning of said shaft, a lever connected to said pin and normally standing in position to retain the pin in stop engagement with said part, a clutch member feathered on said shaft for movements into and out of engagement with said drive means, means for controlling the clutch engaging and releasing movements of said clutch member, and connection between said control means and lever operable to effect a release of said pin from stop engagement with said part when the control means is moved to release the clutch member.

2. In combination, a shaft, drive means for said shaft and normally disengaged therefrom, a clutch collar feathered to said shaft and normally operable to engage said drive means, clutch collar engaging means operable to release the clutch collar to permit its engagement with said drive means and to impart a releasing movement to said collar at a predetermined point in a rotation thereof, control means for said clutch engaging means, a lever having pin and slot connection with said control means whereby a releasing movement of said control means will move the lever from normal position and permit it to remain out of normal position when the control means is returned to its normal position, means normally retaining said lever in one position of its movement, and means carried by said lever and operable to engage a part of said clutch collar and stop the rotation thereof when at a predetermined point in its rotation.

In testimony whereof, I have hereunto signed my name to this specification.

BURTON C. AMES.

Copies of this patent may be obtained for five cents each, by addressing the "Commissioner of Patents, Washington, D. C."